United States Patent
Nicot

[11] Patent Number: 5,913,251
[45] Date of Patent: Jun. 15, 1999

[54] ROTATING SHAFT INCORPORATING A DEVICE FOR MEASURING TORQUE

[75] Inventor: Christophe Nicot, Annecy, France

[73] Assignee: The Torrington Company, Torrington, Conn.

[21] Appl. No.: 08/920,826

[22] Filed: Aug. 29, 1997

[51] Int. Cl.⁶ .................................................. G01L 3/02
[52] U.S. Cl. ................................................ 73/862.321
[58] Field of Search .......... 73/862.321, 862.331, 73/862.191

[56] References Cited

U.S. PATENT DOCUMENTS 3,191,434  6/1965  Brunner et al. .................. 73/862.331
5,195,382  3/1993  Peilloud .
5,501,110  3/1996  Peilloud et al. .
5,731,529  3/1998  Nicot .................................. 73/862.321

*Primary Examiner*—Richard Chilcot
*Assistant Examiner*—Jewel V. Thompson
*Attorney, Agent, or Firm*—John C. Bigler

[57] ABSTRACT

A rotating shaft is fitted with two members for detecting magnetic field that are arranged symmetrically with respect to the shaft and are mounted on a first support fixed in line with a first point on the axis of the shaft. Two magnetic-field generators are arranged symmetrically with respect to the shaft and are mounted on a second support fixed in line with a second point on the axis of the shaft, the first point and the second point being axially offset from one another. The inner race of a first roller bearing is machined on the periphery of the shaft in line with the second point, where one of the supports, known as the main support, is attached.

7 Claims, 2 Drawing Sheets

ROTATING SHAFT INCORPORATING A DEVICE FOR MEASURING TORQUE

BACKGROUND OF THE INVENTION

This invention relates generally to devices for measuring torque and, more particularly, to a rotating shaft incorporating a torque-measuring device of the type described, for example, in publication FR-2692986.

The device of that publication comprises two magnetic-field generators that are secured to a first support and situated in the plane of a cross section of the shaft and two devices for detecting magnetic fields that are secured to a second support and immobilized in the plane of another cross section of the shaft. Such a device can be mounted directly on a rotating shaft and in theory does not require any local reduction in the rigidity of the shaft, bearing in mind the fact that the device is very sensitive to angular offset. In actual fact, the diameter of the shaft is nonetheless reduced slightly so that the torsional deformation of the shaft can be located axially. In any case, the shaft can withstand the whole of the operating torque without requiring additional means for limiting deformation due to torsion.

In some applications, the length available on the shaft for installing such a torque-measuring device is limited. This is particularly true of a motor vehicle steering box in which a rotating shaft needs to incorporate, along an installed length bounded on one side by the splines which mesh with the steering shaft and on the other sides by the rack pinion, the torque-measuring device as well as a ball bearing. As the accuracy of the torque measured by the device improves with the increase in separation of the points where the supports rest along the shaft, it is desirable for the supports to be placed as close as possible to the ends of the installed length, while at the same time saving space at the end of the installed length for mounting the rolling bearing.

The foregoing illustrates limitations known to exist in present devices and methods. Thus, it is apparent that it would be advantageous to provide an alternative directed to overcoming one or more of the limitations set forth above accordingly, a suitable alternative is provided including features more fully disclosed hereinafter.

One approach to solving this problem might be, perhaps, to make one of the supports an extension of the inner race of the rolling bearing, the race being mounted tightly on the torsion shaft and held by an axial retention device of the circlip type. The outer race of the rolling bearing might be sweated into a rigid housing unable to rotate. In this type of assembly, besides the fact that the axial retention device takes up a certain amount of axial space, the axial and radial loadings applied to the torsion shaft would pass from the torsion shaft into the attachment housing via the rolling bearing. In some loading scenarios, immobilizing the torsion shaft with respect to the inner race of the rolling bearing might prove insufficient, this being all the more true if inconsistent assembly leads to a minimum amount of clamping, given the manufacturing tolerances. This might lead to relative movement, during operation, of the magnetic-field generators with respect to the torsion shaft and, therefore, to a relative movement during operation of the magnetic-field generators with respect to the members that detect magnetic fields. The initial setting would be altered and the torque-sensing device would therefore lose its setting and deliver an erroneous signal.

Another approach to solving the problem might be to mount the inner race of the rolling bearing around the point at which one of the supports rests on the shaft. However, this approach would require increasing the outside diameter of the rolling bearing and would, therefore, imply an overall size that would not be compatible with the rigid housing of the bearing and, more generally, with the space available in which to mount the bearing.

SUMMARY OF THE INVENTION

In one aspect of the invention, this is accomplished by providing a rotating shaft fitted with a device for measuring torque that contains two members for detecting magnetic field that are arranged symmetrically with respect to the shaft and are mounted on a first support fixed in line with a first point on the axis of the shaft. Two magnetic-field generators are arranged symmetrically with respect to the shaft and are mounted on a second support fixed in line with a second point on the axis of the shaft, the first point and the second point being axially offset from one another. The inner race of a first rolling bearing is machined on the periphery of the shaft in line with the point where one of the supports, known as the main support, is attached.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
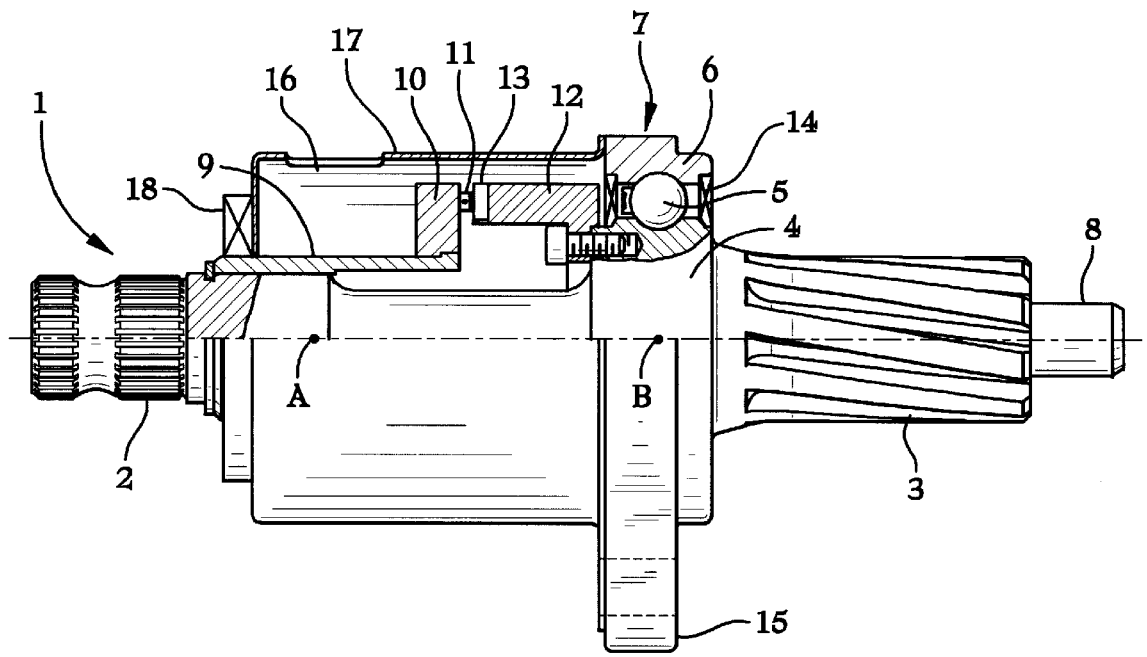
FIG. 1 is a view in longitudinal partial half-section of a shaft fitted with a torque-measuring device and with a ball bearing illustrating an embodiment of the invention.
Figure 2:
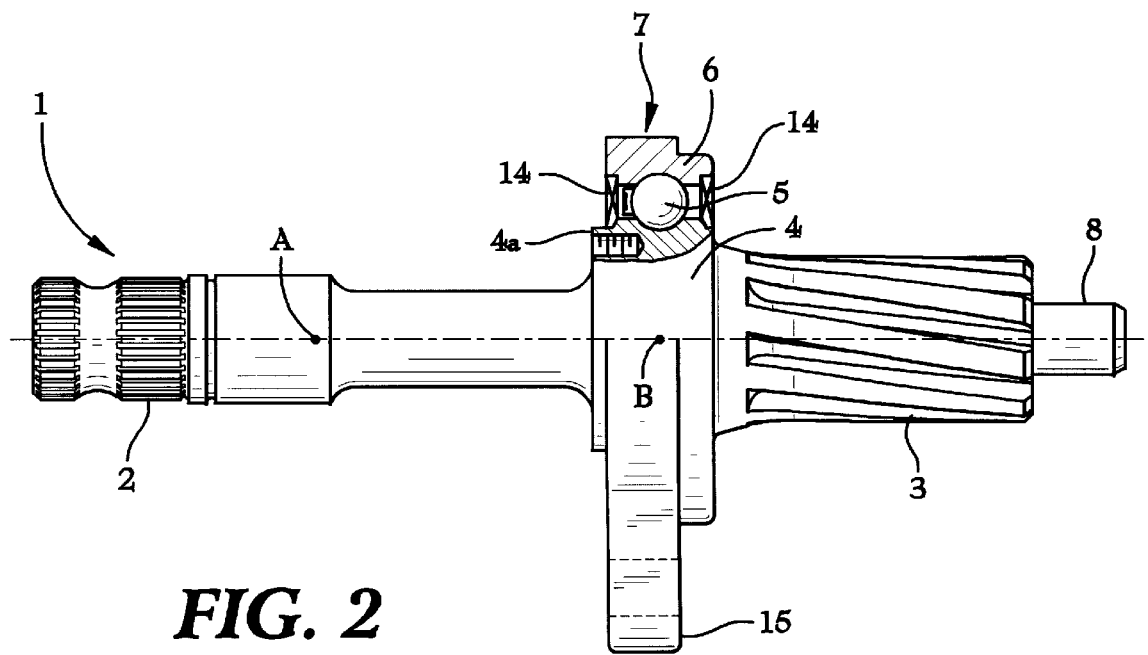
FIG. 2 is a view in longitudinal partial half-section of the shaft and ball bearing of FIG. 1.
Figure 3:
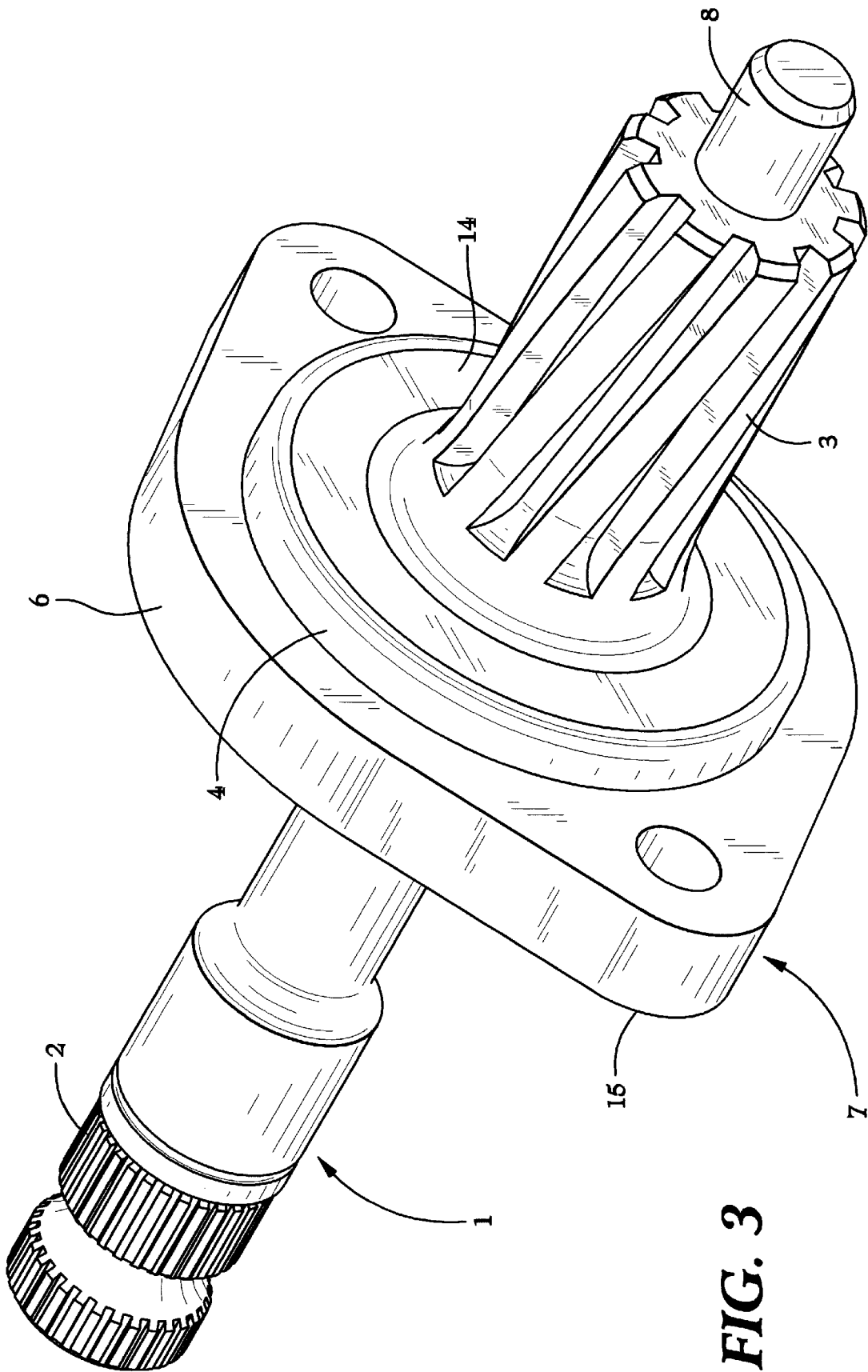
FIG. 3 is a perspective view of the shaft and ball bearing of FIGS. 1 and 2.

Referring now to the drawings, FIGS. 1 through 3 illustrate shaft 1, that provides the link of a steering system between a rack and a steering column shaft (neither of which is depicted). Shaft 1 at its left-hand end has splines 2 allowing it to connect with the steering column shaft. The right-hand end carries rack pinion 3. Shaft 1 has, located immediately to the left of rack pinion 3, a larger-diameter portion that forms collar 4 at the periphery of which is machined a raceway intended to accommodate rolling bodies, particularly, balls 5 held in outer race 6 so as to constitute first rolling bearing 7. The inner race of this bearing consists of collar 4. Rack pinion 3 is extended to its right by shaft land 8 of smaller cross section machined so that it forms the inner race of a second rolling bearing, namely a needle bearing.

Shaft 1 carries a first more or less tubular support 9 which is extended radially by annular part 10 carrying two members 11 that detect magnetic fields and are arranged symmetrically with respect to the axis of shaft 1, one of the detecting members 11 not being visible in the half-section of FIG. 1. Shaft 1 also carries a second more or less tubular support 12 fixed to shoulder 4a of collar 4 and facing toward first support 9. Second support 12 carries two members 13 that generate a magnetic field, arranged symmetrically with respect to the axis of shaft 1 and face detector members 11, one of generator members 13 not being visible in the half-section of FIG. 1. Second support 12 could be fixed to shoulder 4a of collar 4 by any means known to those skilled in the art, for example by bonding or, alternatively, by screws as is depicted in the figures.

This arrangement makes it possible to space as far apart as possible the points A and B on the axis of shaft 1, these points being situated respectively in line with the points where first support 9 and second support 12 are attached, as depicted in the figures. This is because it is desirable, to optimize the accuracy with which the torque is measured, to space these two points A and B as far apart as possible within the space between splines 2 and rack pinion 3. Furthermore, it is necessary to attach rolling bearing 7 somewhere within this same space. The is arrangement described above makes it possible to meet both requirements.

What is more, the inner race, that consists of collar 4 and carries second support 12, forms part of shaft 1. The inner race is therefore unable to shift with respect to shaft 1 and thus lead to inaccuracies in the measurement, as could happen if use were made of an independent rolling bearing the inner race of which would carry second support 12, as in such a case the loadings transmitted by rolling bearing 7 would pass through the second support, which is not the case with shaft 1 according to the invention. Additionally, the assembly according to the invention does not lead to an increase in diameter of rolling bearing 7 because second support 12 is fixed laterally to collar 4, that forms the inner race of bearing 7. Bearing 7 may have one or more sealing devices 14 and its outer race 6 may incorporate flange 15 for attaching the shaft 1 to the steering box, as is depicted in FIG. 3. Outer race 6 may, for example, be made from a forged blank.

In order to locate axially any torsional deformation of shaft 1 between first support 9 and second support 12, shaft 1 has a reduction in diameter between supports 9 and 12. Rotating passage 16 may be formed inside the steering box by means of cap 17 attached to outer race 6 of bearing 7 and sealed with respect to shaft 1 by means of seal 18. Cap 17, that no longer has the mechanical function of attaching bearing 7 as this function is now fulfilled by flange 15 on outer race 6 of bearing 7, may be made of thin pressed sheet.

This configuration makes it possible to separate from each other as far as possible the points at which the supports for the members which sense and for the members which generate the magnetic field are attached, without detracting from the quality of attachment of the supports to the shaft. The inner race is machined at the periphery of a collar that the shaft has, the main support being attached to the shoulder of the collar, facing the other support. This allows the support to be attached to the inner race of the first bearing in a simple and practical way.

Because the outer race of the first bearing has an attachment flange, it is possible to attach the shaft without resort to an external housing with good mechanical properties. The shaft has a reduction in its diameter between the two points where the supports are attached, allowing the torsional deformation to be located axially. The shaft is extended, on the outside of the points where the supports are attached, by a rack pinion on the same side as the main support, and by splines on the other side. The rack pinion is extended by a shaft land that is machined to form the inner race of a second rolling bearing. The first bearing may be a ball bearing and the second bearing may be a needle bearing. Because the main support is formed by the second support, the first support is easier to remove than the second. Accordingly, the members which detect magnetic fields borne by the first support, being more liable to failure than the generators that are in general simply magnets, are easier to replace.

Of course, the invention is not to be in any way restricted to the embodiment described and illustrated, that was given merely by way of example. Specifically, the invention applies to any type of shaft where it is necessary to incorporate a torque-measuring device and a bearing, on a limited length of said shaft.

Having described the invention, what is claimed is:

1. A device for measuring torque comprising:

a rotating shaft;

two members for detecting magnetic field that are arranged symmetrically with respect to the shaft and are mounted on a first support fixed in line with a first point on the axis of the shaft; and two magnetic field generators that are arranged symmetrically with respect to the shaft and are mounted on a second support fixed in line with a second point on the axis of the shaft, the first point and the second point being axially offset from one another;

an inner race of a first roller bearing being formed on a periphery of the shaft in line with the second point where one of the first and second supports, known as the main support, is attached, wherein the inner race is machined at the periphery of a collar of the shaft, the main support being attached to the shoulder of the collar, facing the other support.

2. A device for measuring torque comprising:

a rotating shaft;

two members for detecting magnetic field that are arranged symmetrically with respect to the shaft and are mounted on a first support fixed in line with a first point on the axis of the shaft; and two magnetic field generators that are arranged symmetrically with respect to the shaft and are mounted on a second support fixed in line with a second point on the axis of the shaft, the first point and the second point being axially offset from one another;

an inner race of a first roller bearing being former on a periphery of the shaft in line with the second point where one of the first and second supports, known as the main support, is attached, wherein the outer race of the first bearing has an attachment flange freely rotatable with respect to the magnetic field detectors and the magnetic field generators.

3. A device for measuring torque comprising:

a rotating shaft;

two members for detecting magnetic field that are arranged symmetrically with respect to the shaft and are mounted on a first support fixed in line with a first point on the axis of the shaft; and two magnetic field generators that are arranged symmetrically with respect to the shaft and are mounted on a second support fixed in line with a second point on the axis of the shaft, the first point and the second point being axially offset from one another;

an inner race of a first roller bearing being formed on a periphery of the shaft in line with the second point where one of the first and second supports, known as the main support, is attached, wherein the shaft has a reduction in its diameter between the two points where the supports are attached.

4. A device for measuring torque comprising:

a rotating shaft;

two members for detecting magnetic field that are arranged symmetrically with respect to the shaft and are mounted on a first support fixed in line with a first point on the axis of the shaft; and two magnetic-field generators that are arranged symmetrically with respect to the shaft and are mounted on a second support fixed in line with a second point on the axis of the shaft, the first point and the second point being axially offset from one another;

an inner race of a first roller bearing being formed on a periphery of the shaft in line with the second point where one of the first and second supports, known as the main support, is attached, wherein the shaft includes a rack pinion on the same side of the points where the first and second supports are attached as the main support.

5. A device for measuring torque according to claim 4, wherein the rack pinion is extended by a shaft land that forms an inner race of a second roller bearing.

6. A device for measuring torque according to claim 5, wherein the first bearing is a ball bearing and the second roller bearing is a needle bearing.

7. A device for measuring torque comprising:

a rotating shaft;

two members for detecting magnetic field that are arrange symmetrically with respect to the shaft and are mounted on a first support fixed in line with a first point on the axis of the shaft; and two magnetic-field generators that are arranged symmetrically with respect to the shaft and are mounted on a second support fixed in line with a second point on the axis of the shaft, the first point and the second point being axially offset from one another;

an inner race of a first roller bearing being machined on a periphery of the shaft in line with the second point where one of the first and second supports, known as the main support, is attached, wherein the main support is formed by the second support.

* * * * *